United States Patent [19]

Ishii et al.

[11] 3,800,171

[45] Mar. 26, 1974

[54] DEVICE FOR GENERATING HIGH VOLTAGE

[75] Inventors: Akira Ishii; Kaneichi Kondo, both of Osaka, Japan

[73] Assignee: Matsushita Electric Industrial Co., Ltd., Osaka-fu, Japan

[22] Filed: Oct. 18, 1972

[21] Appl. No.: 298,492

[30] Foreign Application Priority Data

Oct. 25, 1971 Japan .......................... 46-99300[U]

[52] U.S. Cl. .................................... 310/8.7, 310/9.1

[51] Int. Cl. ............................................ H04r 17/00

[58] Field of Search ....... 310/8.7, 9.1; 317/DIG. 11, 317/81; 431/143

[56] References Cited

UNITED STATES PATENTS

| | | | |
|---|---|---|---|
| 3,588,553 | 6/1971 | Westphal | 310/8.7 |
| 3,428,408 | 2/1969 | Ameyama et al. | 310/8.7 X |
| 3,509,388 | 4/1970 | Mifune et al. | 310/8.7 |
| 3,466,474 | 9/1969 | Ochiai | 310/8.7 |
| 3,564,341 | 2/1971 | Nishiura | 310/8.7 X |

*Primary Examiner*—J. D. Miller

*Assistant Examiner*—Mark O. Budd

[57] ABSTRACT

A hammer biased to move toward a piezoelectric ceramic element, is provided in a holder having a piezoelectric ceramic element. Pins are provided on the outer periphery of a hammer in the rectangular direction against the axis thereof, and said pins are projected out of said holder through long grooves provided in an axial direction on the outer peripheral wall of said holder. A cylindrical driving ring is rotatably provided on the outer peripheral surface of said holder at the centre thereof. On one end surface of said driving ring, a series of saw-teeth are cut, and the tapered surfaces of said saw-teeth are brought into contact with said pins. When said driving ring is rotated, the hammer makes a reciprocal movement, and strikes the piezoelectric ceramic element, and high voltage can be repeatedly produced from said piezoelectric ceramic element.

6 Claims, 14 Drawing Figures

FIG. 8
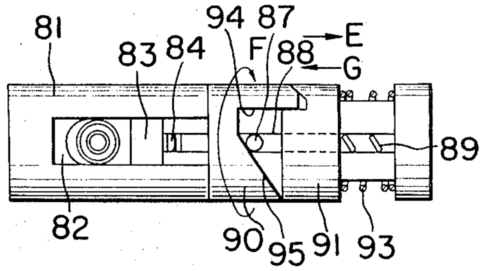
FIG. 10
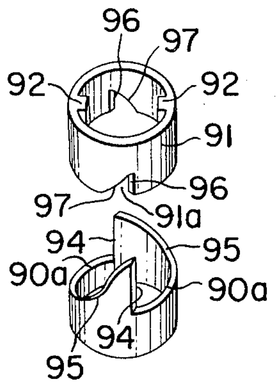
FIG. 9
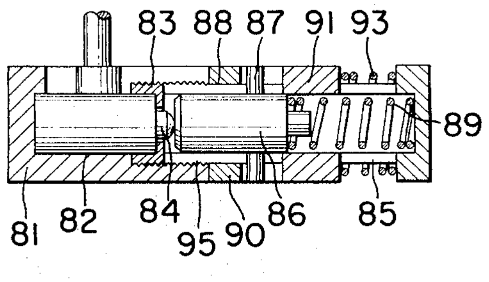
FIG. 12
FIG. 11
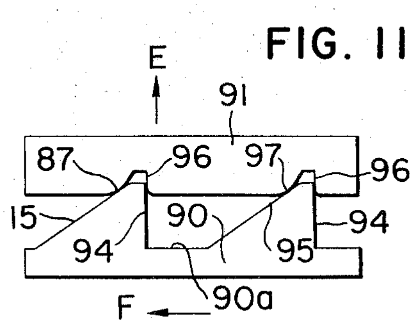
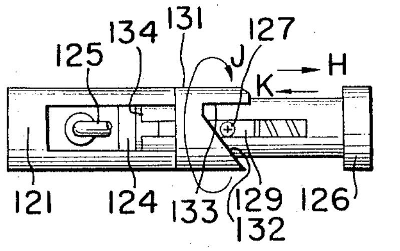
FIG. 13
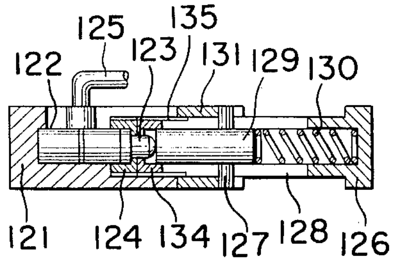
FIG. 14
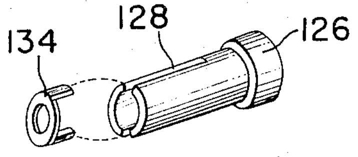

DEVICE FOR GENERATING HIGH VOLTAGE

BACKGROUND OF THE INVENTION

The present invention relates to a device for generating high voltage by repeatedly striking a piezoelectric ceramic element.

The conventional devices for generating high voltage by utilizing a piezoelectric ceramic element are used in many fields, but no miniature type device for generating high voltage by using such an element has yet been provided.

SUMMARY OF THE INVENTION

One of the object of the present invention is to provide a miniature device for generating high voltage.

Another object of the present invention is to provide a strong and economical device for generating high voltage.

In accordance with the present invention, a hammer biased to move toward a piezoelectric ceramic element is provided in a holder. On the outer peripheral surface of a hammer, pins are provided in the rectangular direction against the axis thereof, and said pins are projected out of the holder through the long grooves in axial direction provided on the outer peripheral wall of said holder. On the outer peripheral surface of the holder at the centre thereof, a cylindrical driving ring is rotatably provided. On one end surface of said driving ring, a series of saw-teeth are formed, and said pins are pressed to be contacted onto the tapered surface of said saw-teeth. When the driving ring is rotated, the hammer makes a reciprocal movement, and strikes the piezoelectric ceramic element, and high voltage is generated repeatedly from the piezoelectric ceramic element.

Other objects and features of the present invention will be clarified more in detail by the explanations of the embodiments of this invention given in the following paragraphs in accordance with the attached drawings.

BRIEF DESCRIPTION OF THE DRAWINGS

FIG. 8 shows the ground plan of another embodiment of the present invention;

FIG. 9 shows the cross sectional front view of the same embodiment as in FIG. 8;

FIG. 10 shows an a slant view of the stopper cam and the driving ring of the same embodiment as in FIG. 8;

FIG. 11 shows a part of the development of the driving ring and the stopper cover of FIG. 10;

FIG. 12 shows the ground plan of another embodiment of the present invention;

FIG. 13 shows the ground plan of the embodiment of FIG. 12;

FIG. 14 shows an a slant view of the hammer and the snap ring of the same embodiment as in FIG. 12.

DESCRIPTION OF THE PREFERRED EMBODIMENT

Figure 1:
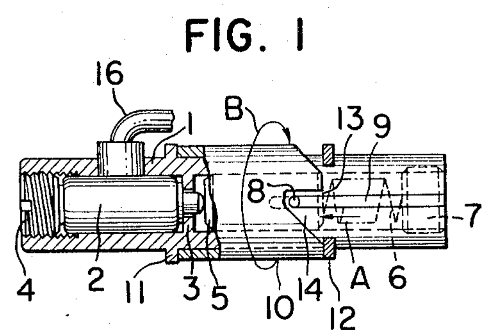
FIG. 1 shows the partially cut off front view of an embodiment of the present invention.
Figure 2:
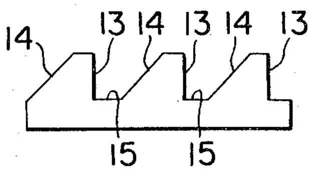
FIG. 2 shows the partial development of the driving ring of the same embodiment as is given in FIG. 1.

In FIG. 1 and FIG. 2, numeral 1 designates a cylindrical holder; 2, a piezoelectric ceramic element held in fixed position against the flange provided on the central internal wall of the holer 1, and the screw 4 screwed into one end portion of said holder 1; numeral 5 designates the hammer movably placed into said holder in such a manner that said hammer faces the piezoelectric ceramic element 2; 6, a spring provided between the hammer and the screw 7 provided on the other end of said holder 1 and providing a force in the direction shown by the arrow A toward the hammer 5; 8, the pins provided on the outer peripheral surface of the hammer 5; and the ends of said pins are projected out of the long slots 9 formed on the outer peripheral surface of said holder 1 in the axial direction. Numeral 10 designates a driving ring rotatably engaged on the outer periphery of the holder 1; 11, a flange provided on the outer peripheral surface of the holder 1 for stopping the movement of said driving ring 10 in the axial direction; 12, a ring engaged in the outer periphery of the holder 1 for performing the same function as the flange 11. On one end surface of the driving ring 10, a plural number of saw-teeth 15 having the stage portions 13 and the tapered portions 14 as is shown in FIG. 2. The pins 8 provided on the outer peripheral surface of the hammer 5 face said teeth 15.

In the above given embodiment, when the driving ring 10 is rotated in the direction as is shown by the arrow B, the pins 8 are brought into contact with the tapered portions 14 formed on one end surface of the driving ring 10, and are pushed in the direction opposite to that of the arrow A along the tapered portions 14, and therefore the hammer 5 is also displaced in the direction opposite to the direction of the arrow A. Therefore, the spring 6 is slowly compressed, and the energy for strongly striking the piezoelectric ceramic element 2 is accumulated therein. When the driving ring 10 is further rotated, the pins 8 fall into the stages 13 from the end surface of the driving ring 10, the hammer 5 moves quickly in the direction shown by the arrow A with the energy accumulated in said spring 6. Therefore, the hammer 5 hits the piezoelectric ceramic element 2, sharply and high voltage is generated from the element. The generated high voltage is fed out by the lead wire 16.

After the hammer 5 strikes the piezoelectric ceramic element 2, the hammer 5 resumes its original position, and therefore when the driving ring 10 is further rotated, the same operation as before is repeated, and high voltage can be obtained from the piezoelectric ceramic element repeatedly.

As is apparent from the above explained embodiment, in accordance with the present invention, the hammer which is always energized to move toward the piezoelectric ceramic element, is contained in the holder with the piezoelectric ceramic element placed therein, and the pins projected out of the long holes in the axial direction formed on the outer peripheral surface of the holder are provided on the outer peripheral surface of said hammer, and the driving ring rotatably engaged on the outer periphery of said holder is provided with a plural number of saw-teeth having the stages and tapered portions faced against said pins. Thus, it is possible to produce high voltage repeatedly by the rotation of the driving ring.

It is also possible to miniaturize the device as the driving ring is engaged on the outer periphery of the middle portion of the holder.

Said driving ring has, on one end surface thereof, a plural number of saw-teeth composed of stages and tapered portions facing the pins provided on the hammer, and therefore the driving ring can be easily produced.

In addition, in accordance with the present invention, the pins 8 provided on the outer peripheral surface of the hammer project out of the long slots 9 formed on the outer peripheral surface of the holder in the axial direction, and therefore no rotation-loss of the hammer results from the rotation of the driving ring, and the hammer can be displaced in the axial direction without any rotation-loss at all.

Thus, in accordance with the present invention, a cigarette-lighter can be constructed in a completely different style from conventional lighters because the device of this invention can be miniaturized as a whole.

In other words, the conventional devices for generating high voltage of this kind are of the push type, and when applied to cigarette lighter, there are many restrictions on the style, but in accordance with the present invention, it is possible to obtain high voltage by a rotary operation, and therefore the style of the cigarette-lighter can be completely changed.

The embodiment of FIGS. 3 to 7 is further explained.

Generally speaking, the striking mechanism of the device for generating high voltage, the indispensable factors are the hammer for striking the piezoelectric ceramic element, the driving ring for accumulating striking energy and for transferring the hammer against the hammer-spring, and the hammer-pins for transferring the driving ring provided on the hammer.

In the conventional devices, the driving ring is made of metal in most cases, and the hammer-pins are made of metal. Of course there are exceptions, but the structure in the exceptional cases becomes large, and when the hammer-pins and hammer are simultaneously shaped of resin material, it is necessary to use large hammer-pins to avoid break-down.

Regardless of the fact that the driving ring is made of metal or resin, to make the hammer-pins of resin, it is as a practical matter to make the pins large because of deformation and abrasion.

On the other hand, it is preferable that the driving a resinous material should be made of resin in view of the cost of production, efficiency, and processability, but when the hammer is made of metal, the driving ring is worn out, and the durability of the driving ring is poor. When the hammer and pins are made of a resinous material, they do not work effectively because of the deformation of the hammer-pins, and for these reasons, it is difficult to use a resinous material in a device for producing high voltage in such a small structure as a cigarette lighter.

Figure 3:
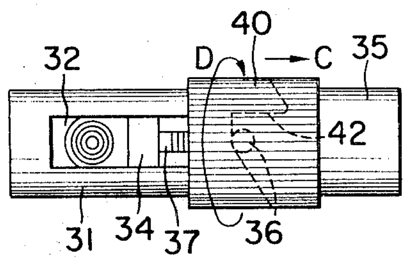
FIG. 3 shows the ground plan of another embodiment of the present invention.

FIG. 3 shows the front view of the device for generating high voltage in which the hammer-pins of the embodiment of this invention are used.

Figure 4:
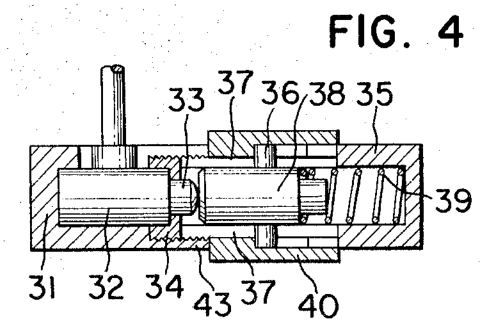
FIG. 4 shows the cross sectional front view of the same embodiment as in FIG. 3.

FIG. 4 shows the cross sectional view of the same embodiment as in FIG. 3;

In FIG. 3 and FIG. 4, numeral 31 designates a holder piece for containing a piezoelectric ceramic element 32, a metal piece 33 for directly receiving a hammer 38, and a screw 34 for fixing said metal piece 33 on one end of the piezoelectric ceramic element 32.

Numeral 35 designates a holder piece for containing a hammer-spring for accumulating the striking energy against the movement of the hammer 38 in the direction shown by the arrow C along long slots 37 in the axial direction as the guide of the hammer-pins 36.

The holder piece 31 and the holder piece 35 are connected by screws in the inner periphery and on the outer peripheries of the holders.

Figure 5:
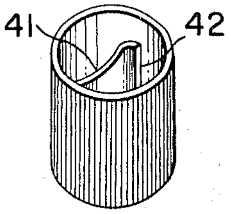
FIG. 5 shows an aslant view of the driving ring of the same embodiment as in FIG. 3.
Figure 6:
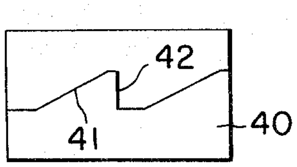
FIG. 6 shows a part of the development of the driving ring of FIG. 5.
Figure 7:
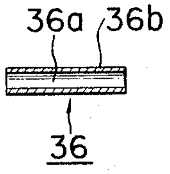
FIG. 7 shows the vertical cross sectional view of the pin in the embodiment of FIG. 3.

The hammer-pins 36 are provided with a coating **36*b* with the polyacetal resin on the periphery of the metal rod 36*a* made of iron or the like as is shown in FIG. 7, and is fixed on the hammer 38 to be projected. Numeral 40 designates a driving ring made of polyacetal resin, and is engaged rotatably on the outer periphery of the holder 35, and has two cans composed of tapered portions 41 and stages 42 as shown in FIG. 5 and FIG. 6. When the driving ring 40 is rotated in the direction as shown by the arrow D in the above given embodiment, the hammer pins 36 are brought into contact with the tapered portions 41 formed on the inner peripheral surface of the driving ring 40, and are pushed toward the direction as shown by the arrow C along the tapered portions 41, and the hammer 38 is also displaced in the direction as shown by the arrow C. Therefore, the hammer-spring 39 is gradually compressed, and accumulates the energy required for strongly striking the piezoelectric ceramic element 32. When the rotation is further continued, the hammer-pins 36 finish riding up the tapered portions 41 of the driving ring 40, and fall into the stages 42, and the hammer 38 is quickly transferred in the direction opposite to the direction as shown by the arrow C by the energy accumulated in the hammer-spring 39, and strongly strikes the piezoelectric ceramic element 32. Thus, high voltage is generated from the piezoelectric ceramic element 32. When the driving ring 40 is further rotated, the same operation as before is carried out, and high voltage can be repeatedly obtained from the piezoelectric ceramic element 32**.

The third embodiment is explained in the following paragraphs.

In FIG. 8 to FIG. 11, a holder piece 81 containing a piezoelectric ceramic element 82, a screw 83 for fixing the piezoelectric ceramic element, and a metal piece 84 for directly being hit, is provided with long slots 88 in the axial direction as the guide for hammer-pins 87, and is provided with a hammer-spring 89 for accumulating the striking energy against the movement of a hammer 86 in a holder piece 85 in the direction as shown by the arrow E, and the holder pieces 81 and 85 are secured by the screw provided on the inner and outer periphery thereof with the connecting portion 95. Numeral 90 designates a driving ring rotatably engaged on the outer periphery of the holder piece 85; numeral 91 designates a stopper-cam movable only in the axial direction against the energy of a return-spring 93, as the rotation thereof is controlled by as an engaging piece 92 which engages the groove of the long holes 88 on the outer periphery of the holder piece 85.

Two cuts 90*a* composed of the stages 94 and the tapers 95, are provided on one end surface of the driving ring 90 as shown in FIG. 8 and FIG. 11, and said end surface is shaped in the form of saw-teeth. The hammer-pins 87 provided on the outer periphery of the hammer 86, are faced against the cuts. On the other hand, two cuts composed of stages 96 and tapers 97 are provided on one end surface of the stopper-cam 91, and when the device is reset, the cuts 91*a* composed of the stages 96 and the tapered portions 97 fall between the stages 94 and the tapered portions 95 of the driving ring 90, as is shown in FIG. 11.

In the above given embodiment, when the driving ring 90 is rotated in the direction of the arrow F, the hammer-pins 87 are brought into contact with the tapered portion 95 formed on the end surface of the driving ring 90, and the hammer 86 is transferred in the direction shown by the arrow E as it is pushed in the direction shown by the arrow E along said tapered portions 95. Therefore, the hammer-spring 89 is gradually compressed and accumulates the energy required for strongly hitting the piezoelectric ceramic element 82.

The stopper-cam 91 engaged in the cuts of the driving ring 90 is displaced in the direction shown by the arrow E against the return spring 93 as the tapered portions 97 of the stopper-cam 91 are pushed up into the tapered portions 95 of the driving ring 90.

When the rotation is further continued, the hammer-pins 87 push up the stopper-cam 91 being pushed in the direction shown by the arrow B by the driving ring 90, and fall into the stages 94 from the end surface of the driving ring 90, and the hammer 86 is transferred in the direction shown by the arrow G abruptly with the energy accumulated by the hammer-spring 89 to strongly hit the piezoelectric ceramic element 82, and high voltage is generated from the piezoelectric ceramic element 82.

When the rotation is further continued, the stopper-cam 91 is always pressed in the direction shown by the arrow G by the energy of the return spring 93, and the stopper-cam 91 falls onto the driving ring 90 when the stages 94 and the tapered portions 95 of the operation ring 90 have come to the cuts 91*a* of the tapered portions 97 and the stages 96 of the stopper-cam 91, and the stopper-cam 91 is reset into the original state. In regard to the rotation of the driving ring 90, it is almost the same as that of the conventional rotary system lighter utilizing a flint. When the driving ring 90 is further rotated by the force of rotation, the same operation as before is carried out, and high voltage can be obtained from the piezoelectric ceramic element 82.

In the above embodiment, the loose contact present between the taper-cam of the rotary driving ring and a hammer-pins can be removed by providing the stopper-cam.

The fourth embodiment is explained in the following paragraphs;

In FIG. 12 and FIG. 13, numeral 121 designates a holder piece for containing a piezoelectric ceramic element 122, a metal piece 123 for directly being struck by the hammer, and a screw 124 for fixing said metal piece 123 on one end of said piezoelectric ceramic element 122, and numeral 125 designates a high voltage lead wire for taking out the high voltage generated in the piezoelectric ceramic element 122. Numeral 126 designates a holder piece having long holes 128 on the outer peripheral wall thereof in the axial direction as the guide for hammer-pins 127, and contains a hammer-spring 130 for accumulating striking energy against the movement of a hammer 129 in the direction shown by the arrow H. The pieces 121 and 126 are fixed by the connecting portion 135 by the screws cut on the inner and outer peripheries thereof. Numeral 131 designates a driving ring engaged rotatably on the outer periphery of said holder piece 126, and is provided with two cams composed of the tapered portions 132 and the stages 133.

Numeral 134 designates a snap ring provided on the end portion of the long hole 128 formed on said holder piece 126 as is shown in FIG. 14, and the features of this embodiment resides in said snap ring.

In the above given embodiment, when the driving ring 131 is rotated in the direction shown by the arrow J, the hammer-pins 127 are brought into contact with the tapered portions 132 formed on an end surface of the driving ring 131, and are pushed in the direction shown by the arrow H along said tapered portions 132, and the hammer 129 is also transferred in the direction shown by the arrow H. Therefore, the hammer-spring 130 is gradually compressed and accumulates the energy required for strongly hitting the piezoelectric ceramic element 122. When the rotation is further continued, the hammer-pins 127 fall into the stages 133 from the tapered portions 132 of the driving ring 131. The hammer 129 is quickly displaced in the direction shown by the arrow K by the energy accumulated in the hammer-spring 130, and strongly hits the metal piece 123, and the piece hits the piezoelectric ceramic element 122. Thus, high voltage is generated from the piezoelectric ceramic element 122, and the generated high voltage can be taken out by means of the high voltage lead wire 125. When the driving ring 131 is further rotated, the same operation as before can be carried out, and high voltage can be repeatedly obtained from the piezoelectric ceramic element 122.

In the above given embodiment, the holder piece 121 containing the piezoelectric ceramic element 122, and the holder piece 126 containing the hammer 129 are attached to each other by means of screws as mentioned above, and the screws have a screwing direction the same as the rotation of the operation ring 131, and therefore when no snap ring is provided, the long slots 128 serve as the guide for the hammer-pins 127 provided in the axial direction of the peripheral wall of the holder piece 126 is deformed, and large resistance is given to the hammer-pins 127, and as a result the disadvantage arises that the hammer 129 does not strike at a predetermined strength. In the device for generating high voltage of the above given embodiment, there is no danger that the long slots 128 will be deformed and no bad effect should occur to the holder piece 126 by providing the snap ring 134 at the end of the long slots 128 formed on the holder piece 126.

Therefore, it is possible to obtain a device of remarkably stable quality for generating high voltage.

What is claimed is:

1. A device for generating high voltage comprising:

a cylindrical holder;

a piezoelectric ceramic element fixed and contained in one end of said cylindrical holder;

a hammer axially slidably mounted in the other end of said cylindrical holder;

a spring between said hammer and said other end of said holder for biasing said hammer to move toward said piezoelectric ceramic element;

a driving ring rotatably fitted on the outer circumference of said cylinder and coaxial therewith, said ring having an end surface formed with saw teeth facing said other end of said cylinder;

means inhibiting movement of said ring longitudinally of said cylinder;

straight longitudinally extending slots in the wall of said cylinder;

pins on said hammer extending through said slots for engagement in the longitudinal direction of said cylinder with said saw teeth, whereby rotation of said ring effects the displacement of said hammer toward said other end of said cylinder and the subsequent release thereof to strike said piezo electric ceramic element to generate a high voltage from said element.

2. The device of claim 6 comprising a coating of a non-metallic material on the periphery of said pins.

3. The device of claim 1 further comprising a stopper cam ring fitted on the outer circumeference of said cylinder at said other end thereof, means biasing said stopper cam ring toward said driving ring, said stopper cam ring having nuts engaging the saw teeth of said driving ring, and means inhibiting rotation of said stopper cam ring on said cylinder.

4. The device of claim 1 wherein said cylindrical holder comprises first and second cylindrical members having mutually engaged threaded ends.

5. The device of claim 4 wherein said slots extend in said first member toward the threaded ends thereof, and further comprising a snap ring fitted in said slots at said threaded end for preventing deformation of said first member.

6. The device of claim 1 wherein said cylinder is comprised of first and second cylindrical members having mutually engaged threaded ends, the central portion of said cylindrical holder having a lesser diameter than the end portions thereof, said driving ring being rotatably fitted on said central portion.

* * * * *

UNITED STATES PATENT OFFICE
CERTIFICATE OF CORRECTION

Patent No. 3,800,171 Dated March 26, 1974

Inventor(s) Akira Ishii, et al

It is certified that error appears in the above-identified patent and that said Letters Patent are hereby corrected as shown below:

Column 2, line 13: "holer" should be --holder--

Column 3, line 57: after "driving" insert --ring should be made of-- line 58: cancel "should be made of resin"

Column 4, line 67: cancel "as"

Column 7, line 22: replace "6" by --1--

Signed and sealed this 8th day of October 1974.

(SEAL)
Attest:

McCOY M. GIBSON JR.
Attesting Officer

C. MARSHALL DANN
Commissioner of Patents